United States Patent
Proserpio et al.

(10) Patent No.: US 9,627,860 B2
(45) Date of Patent: Apr. 18, 2017

(54) FRAME ASSEMBLY FOR A SWITCHBOARD AND RELATED FRAME AND SWITCHBOARD

(71) Applicant: ABB S.p.A., Milan (IT)

(72) Inventors: Simone Angelo Proserpio, Valbrona (IT); Massimo Frattaruolo, Veduggio con Colzano (IT)

(73) Assignee: ABB S.p.A., Milan (IT)

( * ) Notice: Subject to any disclaimer, the term of this patent is extended or adjusted under 35 U.S.C. 154(b) by 97 days.

(21) Appl. No.: 14/303,958

(22) Filed: Jun. 13, 2014

(65) Prior Publication Data
US 2014/0374369 A1 Dec. 25, 2014

(30) Foreign Application Priority Data
Jun. 24, 2013 (EP) .................................... 13173392

(51) Int. Cl.
*A47F 7/00* (2006.01)
*H02B 1/01* (2006.01)

(52) U.S. Cl.
CPC ............. *H02B 1/012* (2013.01); *H02B 1/013* (2013.01)

(58) Field of Classification Search
CPC .............................. H02B 1/012; H02B 1/013
USPC ......... 312/223.1, 265.1–265.4; 211/26, 26.2, 211/182, 183
See application file for complete search history.

(56) References Cited

U.S. PATENT DOCUMENTS

| | | | | |
|---|---|---|---|---|
| 3,066,244 A | * | 11/1962 | Defandorf | H02B 1/21 174/559 |
| 3,307,894 A | * | 3/1967 | Collier | A47B 47/03 312/265.2 |
| 4,544,069 A | * | 10/1985 | Cavallini | H02B 1/01 211/183 |
| 4,610,561 A | * | 9/1986 | Cecchellero | E04B 1/1912 403/171 |
| 4,643,319 A | * | 2/1987 | Debus | H02B 1/01 211/182 |
| 4,997,240 A | * | 3/1991 | Schmalzl | H05K 9/0062 312/265.2 |

(Continued)

FOREIGN PATENT DOCUMENTS

WO WO 2013/072788 A1 5/2013

OTHER PUBLICATIONS

Search Report mailed on Oct. 7, 2013, by the European Patent Office for Application No. 13173392.5.

*Primary Examiner* — Joshua J Michener
*Assistant Examiner* — Devin Barnett
(74) *Attorney, Agent, or Firm* — Taft Stettinius & Hollister LLP

(57) ABSTRACT

An assembly for the frame of a switchboard is disclosed, which can include a hollow member which extends lengthwise along a reference axis and which has at least one slot. The assembly can include at least one connecting element for connecting the assembly to a corresponding corner joint element of the frame, and the connecting element can include an insulating body and a fixing metal plate which is associated to a carrying part of the insulating body. The carrying part can be at least partially inserted transversally with respect to the reference axis into the hollow member through the slot, so as to arrange at least a portion of the associated fixing metal plate into the hollow member transversally with respect to the reference axis.

14 Claims, 11 Drawing Sheets

(56) References Cited

U.S. PATENT DOCUMENTS

| | | | |
|---|---|---|---|
| 5,228,762 A * | 7/1993 | Mascrier | H02B 1/01 312/265.1 |
| RE34,393 E * | 9/1993 | McIlwraith | H05K 7/183 312/265.4 |
| 5,292,189 A * | 3/1994 | Lau | H05K 7/183 312/265.3 |
| 5,312,078 A * | 5/1994 | Marsh | A47B 96/06 248/220.1 |
| 5,407,263 A * | 4/1995 | Jones | A47B 47/03 312/265.1 |
| 5,423,604 A * | 6/1995 | Chern | A47B 47/0008 312/265.1 |
| 5,451,115 A * | 9/1995 | Sayres | A47B 47/0008 403/171 |
| 5,584,406 A * | 12/1996 | Besserer | F16M 1/00 211/189 |
| 5,695,263 A * | 12/1997 | Simon | H05K 7/183 312/265.1 |
| 5,749,476 A * | 5/1998 | Besserer | H02B 1/301 211/182 |
| 5,806,946 A * | 9/1998 | Benner | H05K 7/183 312/265.3 |
| 5,820,289 A * | 10/1998 | Kern | H02B 1/01 211/182 |
| 5,905,631 A * | 5/1999 | Winkler | H02B 1/36 211/162 |
| 5,930,972 A * | 8/1999 | Benner | H02B 1/01 211/189 |
| 5,997,117 A * | 12/1999 | Krietzman | H02B 1/301 312/265.4 |
| 6,036,290 A * | 3/2000 | Jancsek | H02B 1/301 312/223.3 |
| 6,039,420 A * | 3/2000 | Besserer | A47B 47/02 211/189 |
| 6,142,594 A * | 11/2000 | Benner | H02B 1/01 312/258 |
| 6,149,255 A * | 11/2000 | Benner | H02B 1/303 312/257.1 |
| 6,155,434 A * | 12/2000 | Benner | H02B 1/32 211/190 |
| 6,164,460 A * | 12/2000 | Reuter | H02B 1/01 211/189 |
| 6,174,034 B1 * | 1/2001 | Benner | H02B 1/301 211/26 |
| 6,190,081 B1 * | 2/2001 | Besserer | H02B 1/32 211/183 |
| 6,206,494 B1 * | 3/2001 | Benner | H02B 1/301 174/50 |
| 6,231,142 B1 * | 5/2001 | Pochet | H02B 1/16 211/189 |
| 6,270,283 B1 * | 8/2001 | Turati | H02B 1/01 403/174 |
| 6,283,565 B1 * | 9/2001 | Kohler | H02B 1/38 16/389 |
| 6,315,132 B1 * | 11/2001 | Hartel | H02B 1/301 211/189 |
| 6,348,656 B1 * | 2/2002 | Thielmann | H05K 7/183 174/50 |
| 6,379,074 B1 * | 4/2002 | Chin | F16B 7/0486 403/171 |
| 6,419,331 B2 * | 7/2002 | Wei | A63F 9/00 312/140 |
| 6,452,810 B1 * | 9/2002 | Wilcox | H05K 7/1418 312/223.1 |
| 6,516,955 B1 * | 2/2003 | Dudhwala | A47B 47/0008 211/182 |
| 6,575,657 B1 * | 6/2003 | Reuter | H02B 1/32 211/183 |
| 6,615,998 B2 * | 9/2003 | Klassen | E05D 5/023 211/183 |
| 6,814,417 B2 * | 11/2004 | Hartel | H02B 1/32 211/26 |
| 6,902,068 B1 * | 6/2005 | Fontana | H02B 1/01 211/189 |
| 6,915,616 B2 * | 7/2005 | Fontana | H05K 7/183 312/265.1 |
| 7,839,635 B2 * | 11/2010 | Donowho | H05K 7/20572 211/184 |
| 8,091,970 B2 * | 1/2012 | Francisquini | H02B 1/301 211/192 |
| 8,152,403 B2 * | 4/2012 | Shen | H02B 1/01 211/182 |
| 8,225,945 B2 * | 7/2012 | Fan | H05K 7/1488 211/182 |
| 8,395,046 B2 * | 3/2013 | Nicewicz | H02B 1/202 174/17 R |
| 8,746,465 B2 * | 6/2014 | Roth | H02B 1/32 211/26 |
| 8,901,418 B2 * | 12/2014 | Walker | H05K 5/0247 174/50 |
| 8,944,533 B2 * | 2/2015 | Hofmann | H02B 1/01 312/265.1 |
| 2001/0037988 A1 * | 11/2001 | Knab | H02B 1/01 211/189 |
| 2002/0084728 A1 * | 7/2002 | Elm | E05B 53/005 312/222 |
| 2002/0167250 A1 * | 11/2002 | Klassen | H02B 1/301 312/265.1 |
| 2002/0175604 A1 * | 11/2002 | Klassen | H02B 1/301 312/265.4 |
| 2003/0048048 A1 * | 3/2003 | Altena | H02B 1/01 312/265.4 |
| 2003/0071002 A1 * | 4/2003 | Hung | H05K 7/183 211/183 |
| 2004/0004418 A1 * | 1/2004 | Wyatt | H05K 7/183 312/265.1 |
| 2004/0201335 A1 * | 10/2004 | Davis | G06F 1/181 312/265.3 |
| 2005/0174020 A1 * | 8/2005 | Francisquini | H02B 1/01 312/265.3 |
| 2007/0052333 A1 * | 3/2007 | Freire | A47B 47/005 312/265.4 |
| 2007/0210686 A1 * | 9/2007 | Adducci | A47B 81/00 312/265.2 |
| 2007/0247040 A1 * | 10/2007 | Cardenas | H05K 7/183 312/265.1 |
| 2009/0178821 A1 | 7/2009 | Zavidniak et al. | |
| 2009/0236957 A1 * | 9/2009 | Hudz | G11B 33/02 312/265.4 |
| 2010/0308703 A1 * | 12/2010 | Schell | H02B 1/32 312/265.1 |
| 2010/0314982 A1 * | 12/2010 | Luo | A47B 47/0008 312/351.1 |
| 2011/0012489 A1 * | 1/2011 | Shen | A47B 96/14 312/326 |
| 2011/0050052 A1 * | 3/2011 | Elkins | H04Q 1/09 312/223.1 |
| 2011/0309046 A1 * | 12/2011 | Lee | A47B 47/03 211/182 |
| 2012/0012543 A1 * | 1/2012 | Fan | H05K 7/1488 211/26 |
| 2012/0012544 A1 * | 1/2012 | Fan | H05K 7/1488 211/26 |
| 2012/0012549 A1 * | 1/2012 | Fan | H05K 7/1489 211/183 |
| 2012/0024811 A1 * | 2/2012 | Fan | H05K 7/1488 211/183 |
| 2012/0125870 A1 * | 5/2012 | Decroos | A47F 5/10 211/26 |
| 2013/0069501 A1 * | 3/2013 | Liu | H05K 7/18 312/223.1 |
| 2013/0257243 A1 * | 10/2013 | Bader | A47B 96/00 312/265.2 |
| 2013/0320822 A1 * | 12/2013 | Cagliani | H05K 5/0004 312/223.1 |

(56) References Cited

U.S. PATENT DOCUMENTS

| | | | | |
|---|---|---|---|---|
| 2014/0190910 A1* | 7/2014 | Arflack | ............... | A47B 55/00 211/26 |
| 2015/0028729 A1* | 1/2015 | Frattaruolo | ............. | H05K 5/02 312/223.1 |
| 2015/0200523 A1* | 7/2015 | Boehme | ............... | H05K 7/183 211/182 |

* cited by examiner

FRAME ASSEMBLY FOR A SWITCHBOARD AND RELATED FRAME AND SWITCHBOARD

RELATED APPLICATION(S)

This application claims priority under 35 U.S.C. §119 to European Patent Application No. 13173392.5 filed in Europe on Jun. 24, 2013, the entire content of which is hereby incorporated by reference in its entirety.

FIELD

The present disclosure relates to a frame assembly of a switchboard.

BACKGROUND INFORMATION

Known switchboards, such as a distribution or automation switchboard, include a frame which defines an internal space for housing one or more electric or electronic components and/or elements of the switchboard.

For example, the frame of a low voltage distribution switchboard can house, for example, circuit breakers, bus bars, control buttons, cable conduits, supporting guides.

The frame constitutes a structural skeleton to which various components and/or accessories of the switchboard, such as, for example, the supporting elements for its electric or electronics elements, cladding panels, the top cover, the base, the door can be operatively connected.

The frame can have a substantially parallelepiped structure defined by frame members arranged substantially horizontally, and can be referred to as cross-members or rails, and by frame elements which are arranged vertically and can be referred to as uprights.

According to a known arrangement, these frame members are mutually coupled by four joint elements at the corners of the parallelepiped structure. For example, each frame member, constituted only by its own hollow elongated body, is connected to a corresponding corner joint element by a plurality of fixing screws or by welding.

In order to allow adequate connection and avoid relative displacements between the frame members and the corresponding corner joint elements, a large number of fixing screws (at least two for each coupling between a frame member and the corner joint element) and/or massive and structurally complex corner joint elements can be used.

Elements used for assembling the frame are packaged and delivered to customers. The use of massive and structurally complex corner joint elements can result in a cumbersome and expensive packaging.

Therefore, an assembling of the frame can be a difficult and expensive operation, requiring long execution times and also implying cumbersome and expensive packaging solutions.

In light of above although known arrangements can perform in a satisfying way, there is still reason and desire for further improvements.

SUMMARY

An assembly for a frame of a switchboard is disclosed, comprising: a hollow member extending lengthwise along a reference axis and including at least one slot; at least one connecting element configured for connecting the assembly to a corresponding corner joint element of the frame, the connecting element including an insulating body having a carrying part; and a fixing metal plate for the carrying part of the insulating body, wherein the carrying part is at least partially inserted transversally, with respect to the reference axis, into the hollow member through the slot, so as to arrange at least a portion of the fixing metal plate into the hollow member transversally with respect to the reference axis.

BRIEF DESCRIPTION OF THE DRAWINGS

Further characteristics and advantages will be more apparent from the description of exemplary, but non-exclusive, embodiments of a frame assembly, and related frame and switchboard, illustrated only for non-limitative exemplary purposes in the accompanying drawings, wherein.

Figure 2:
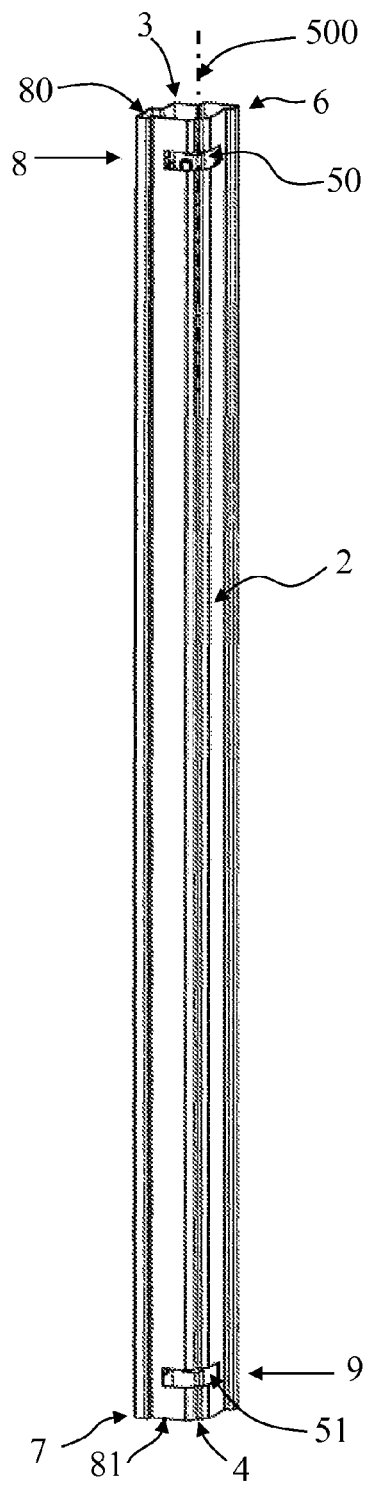
FIGS. 1 and 2 are a front perspective view and a rear perspective view, respectively, of a hollow member which is adapted to be used for a frame assembly according to an exemplary embodiment of the present disclosure.

It should be noted that in the detailed description that follows, identical or similar components, either from a structural and/or functional point of view, have the same reference numerals, regardless of whether they are shown in different embodiments. It should also be noted that in order to clearly and concisely describe the present disclosure, the drawings may not necessarily be to scale and certain features of the disclosure may be shown in somewhat schematic form.

DETAILED DESCRIPTION

Exemplary embodiments of the present disclosure provide a frame for a switchboard including at least one corner joint element connected to one or more frame assemblies.

Exemplary embodiments of the present disclosure provide a switchboard including a frame.

When the term "adapted" is used herein while referring to any component as a whole, or to any part of a component, or to a whole combinations of components, or even to any part of a combination of components, it should be understood that it means and encompasses the term "configured," and refers to structure, and/or configuration and/or shape and/or positioning of the component or part thereof, or combinations of components or parts thereof, such term refers to.

Further, the term "transversal" or "transversally" is used herein to describe the position of one or more first parts and/or components relative to other second parts and/or components, so as to encompass all the positions where such first parts and/or components are not parallel with respect to the other second parts and/or components. Hence, the meaning of "transversal" or "transversally" is not in any way herein limited to a particular case where such first parts and/or components are perpendicular to the second parts and/or components.

With reference to the above cited figures, the exemplary embodiments of present disclosure relate to an exemplary assembly 1 for the frame 100 of a switchboard 200, hereinafter indicated for sake of simplicity as "frame assembly 1". The frame assembly 1 is intended to be connected to a corresponding corner joint element 101 of the frame 100, during the assembling of the structure of the frame 100.

Figure 1:
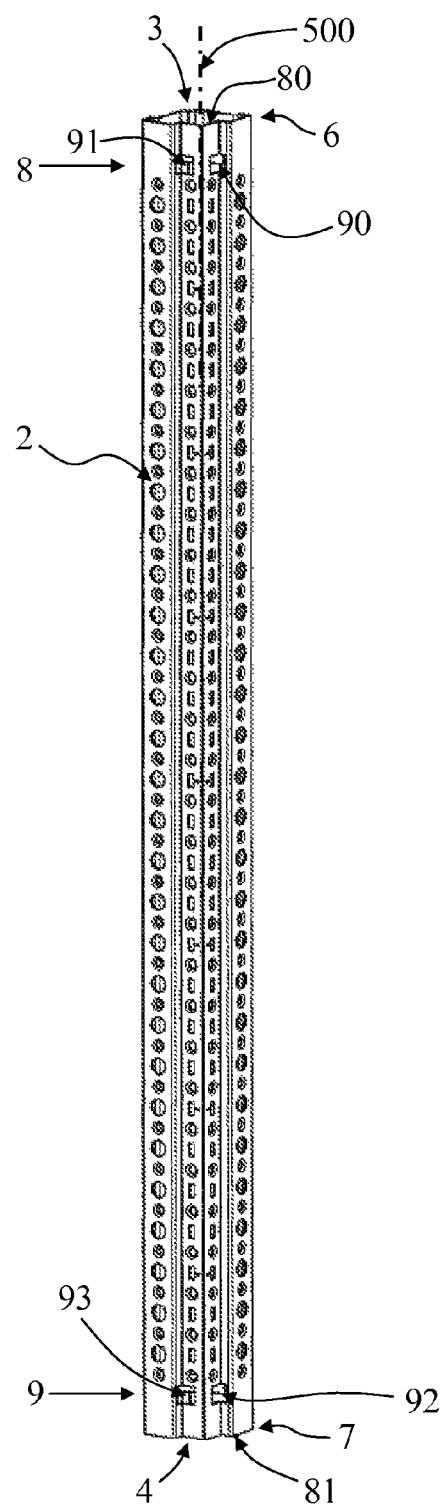

The frame assembly 1 includes a hollow member 2 which longitudinally extends along a reference axis which is depicted by a dotted line and indicated by numeral reference 500 in FIGS. 1 and 2.

The hollow member 2 can be made of metal material, such as for example zinc coated metal sheet or stainless steel.

According to the exemplary embodiment illustrated in FIGS. 1-2, the lengthwise extension of the hollow member 2 along the reference axis 500 is delimited between an upper end 6 and a lower end 7. For example, the hollow member 2 includes an upper edge 80 and a lower edge 81 at the upper end 6 and at the lower end 7, respectively.

A first opening 3 and a second opening 4 are defined transversally with respect to the reference axis 500, at the upper end 6 and at the lower end 7, respectively. In this way, the openings 3 and 4 provide access to the internal space of the hollow member 2 along a lengthwise insertion direction, i.e. an insertion direction which is substantially along the reference axis 500.

The hollow member 2 include at least one slot 50, 51 for accessing its internal space along a transversal insertion direction, i.e. an insertion direction which is substantially transversal with respect to the reference axis 500. In the exemplary embodiment illustrated in FIGS. 1-2, the hollow member 2 includes a first slot 50 and a second slot 51 which are defined at an upper portion 8 and at a lower portion 9, respectively, of the hollow member 2 itself.

Figure 6:
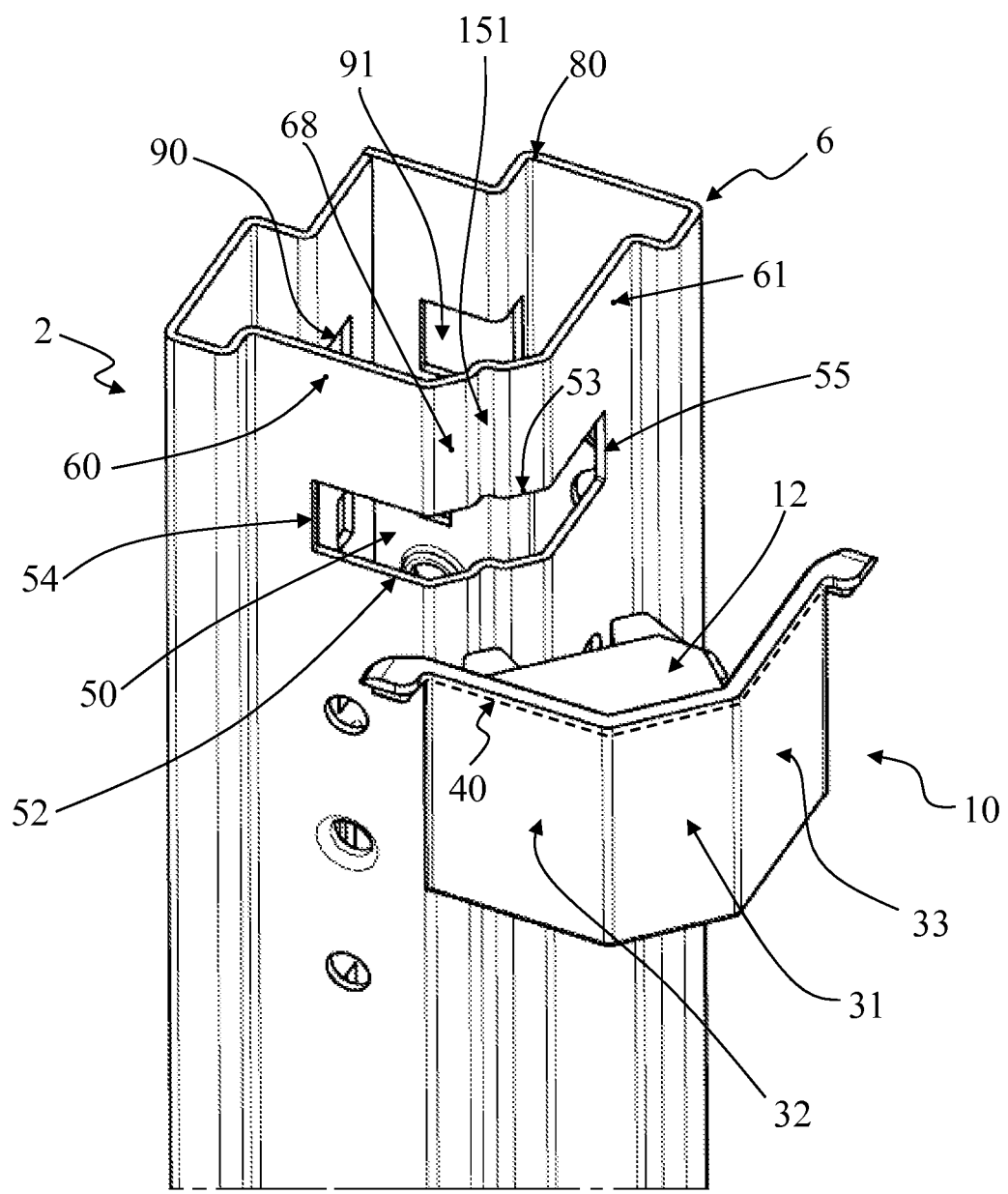
FIG. 6 is a perspective view of the connecting element illustrated in FIG. 4, in phase of assembly with the hollow member illustrated in FIGS. 1-2.

With reference to FIG. 6, each of the slots 50 and 51 can be delimited by a lower tract 52, an upper tract 53, and two lateral tracts 54, 55 of the hollow body 2, wherein such lateral tracts 54, 55 transversally connect the upper and lower tracts 52, 53 to each other.

Figure 3:
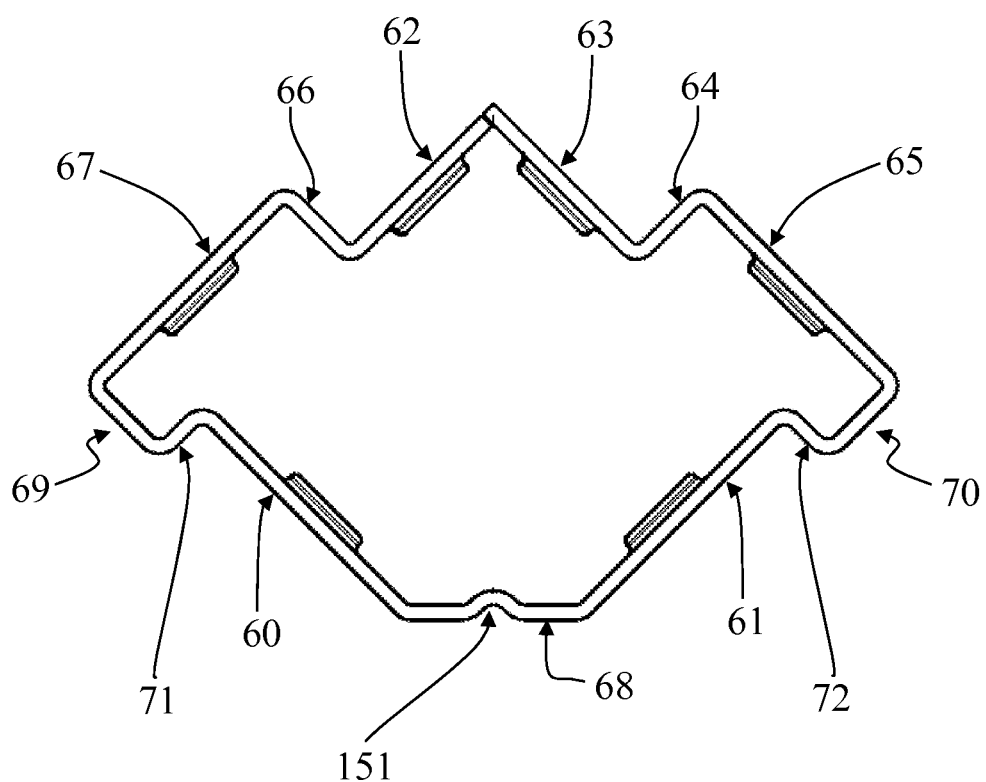
FIG. 3 is a section upper view of the hollow member illustrated in FIGS. 1 and 2.

With reference to FIG. 3, the hollow member 2, seen in a cross section transversal with respect to the reference axis 500, includes at least a central wall 68, a wall 60 and a wall 61 which are connected to the opposed ends of the central wall 68 and which are arranged transversally to each other. The walls 60 and 61 can be arranged perpendicularly to each other.

The slots 50 and 51 can extend along the central wall 68 and at least a tract of the walls 60 and 61.

In the exemplary embodiment illustrated in FIG. 3, the hollow member 2 includes: a central corner defined by a wall 62 and a wall 63, wherein the central corner faces the central wall 68 and the walls 62 and 63 are arranged transversally with respect to the wall 60 and the wall 61, respectively; a first lateral corner defined by a wall 64 and a wall 65, wherein the wall 64 connects the wall 65 to the wall 63; a second lateral corner defined by a wall 66 and a wall 67, wherein the wall 66 connects the wall 67 to the wall 62; a wall 69 and a wall 70 transversally connected to the wall 67 and the wall 65, respectively; a wall 71 connecting the walls 60 and 69 to each other; and a wall 72 connecting the walls 61 and 70.

The walls 60, 61 and the walls 68-72 can define a rear portion of the hollow member 2, i.e., a portion which is intended to face outwards with respect to the internal volume delimited by the structure of the frame 100, while the walls 62-67 can define a front portion of the hollow member 2 (e.g., a portion which is intended to face towards the internal volume delimited by the structure of the frame 100).

The frame assembly 1 can include at least one connecting element 10 for connecting the frame assembly 1, itself, to the corresponding corner joint element 101 of the frame 100.

The connecting element 10 can include an insulating body 11 and a fixing metal plate 12 which is associated to a corresponding carrying part 13 of the insulating body 11 and which is adapted to couple with connector 300 for fixing the frame assembly 1 to the corresponding corner joint element 101.

The insulating body 11 can be realized as a single piece made of elastic material. The insulating body 11 can be made, for example, of rubber, such as rubber produced by die casting. Alternatively, the insulating body 11 can be made of plastic.

Figure 7:
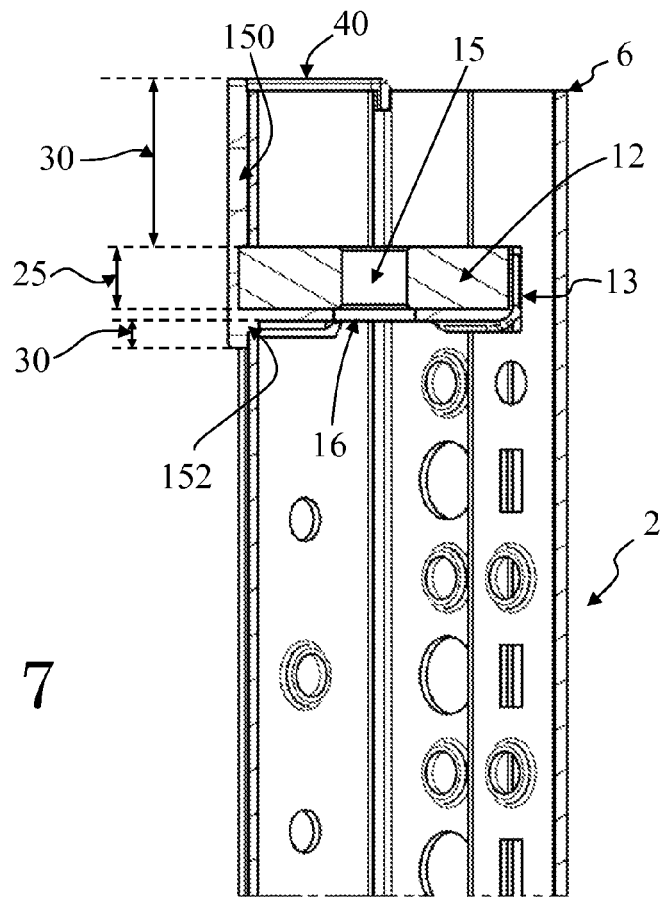
FIG. 7 is a section lateral view of the frame assembly including the hollow member illustrated in FIGS. 1-2 and the connecting element illustrated in FIG. 4.
Figure 8:
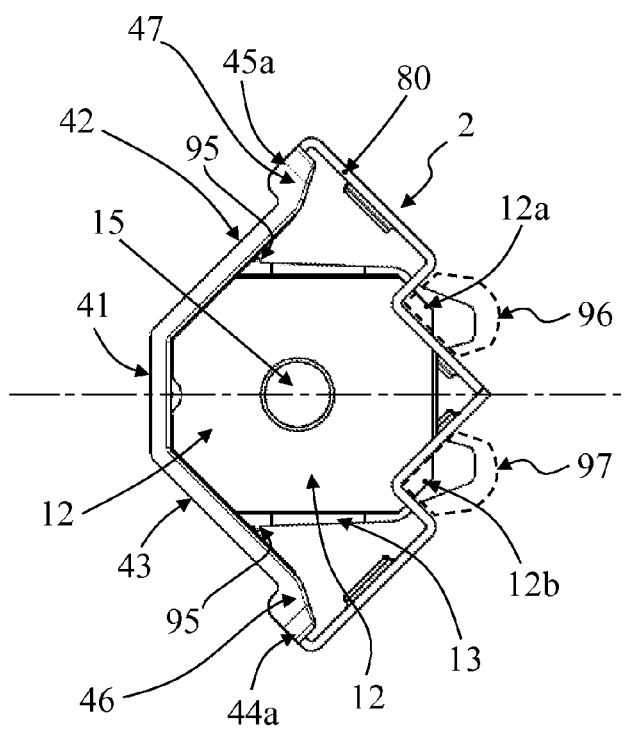
FIG. 8 is a section upper view of the frame assembly illustrated in FIG. 7.

With reference to FIGS. 6-8, the carrying part 13 can be at least partially inserted transversally with respect to the reference axis 500 into the hollow member 2 through a corresponding slot 50, 51 of the hollow member 2 itself, so as to arrange at least a portion of the of the associated fixing metal plate 12 into the hollow member 2 transversally with respect to the reference axis 500.

Hence, the slot 50, 51 allows the passage therethrough of at least a portion of the carrying part 13 and of the carried fixing metal plate 12.

The carrying part 13 can be used to arrange at least a portion of the fixing metal plate 12 inside the hollow member 2, according to a position suitable for allowing the coupling between the fixing metal plate 12 and the corresponding connector 300, wherein such connector 300 can be inserted lengthwise into the hollow member 2.

The frame assembly 1 can include a couple of connecting elements 10. With reference to the exemplary hollow member 2 illustrated in FIGS. 1-2, a first connecting element 10 and a second connecting member 10 can be associated to the upper portion 8 and the lower portion 9 of the illustrated hollow member 2, respectively, by inserting the carrying part 13 and the associated fixing metal plate 12 of the first connecting element 10 into the hollow member 2 through the slot 50, and by inserting the carrying part 13 and the associated fixing metal plate 12 of the second connecting element 10 into the hollow member 2 through the slot 51.

In this way, at least a portion of the fixing metal plates 12 of the first and second connecting elements 10 can be arranged into the hollow member 2 transversally with respect to the lengthwise insertion direction of the corresponding connector 300. For example, the fixing metal plate 12 arranged into the hollow member 2 through the slot 50 faces the opening 3, and the fixing metal plate 12 arranged into the hollow member 2 through the slot 51 faces the opening 4.

The frame assembly 1 realized in such a way can be operatively connected, by its two connecting elements 10, to a corresponding couple of corner joint elements 101 which are disposed at the opposed ends 6 and 7 of the hollow member 2.

Figure 10:
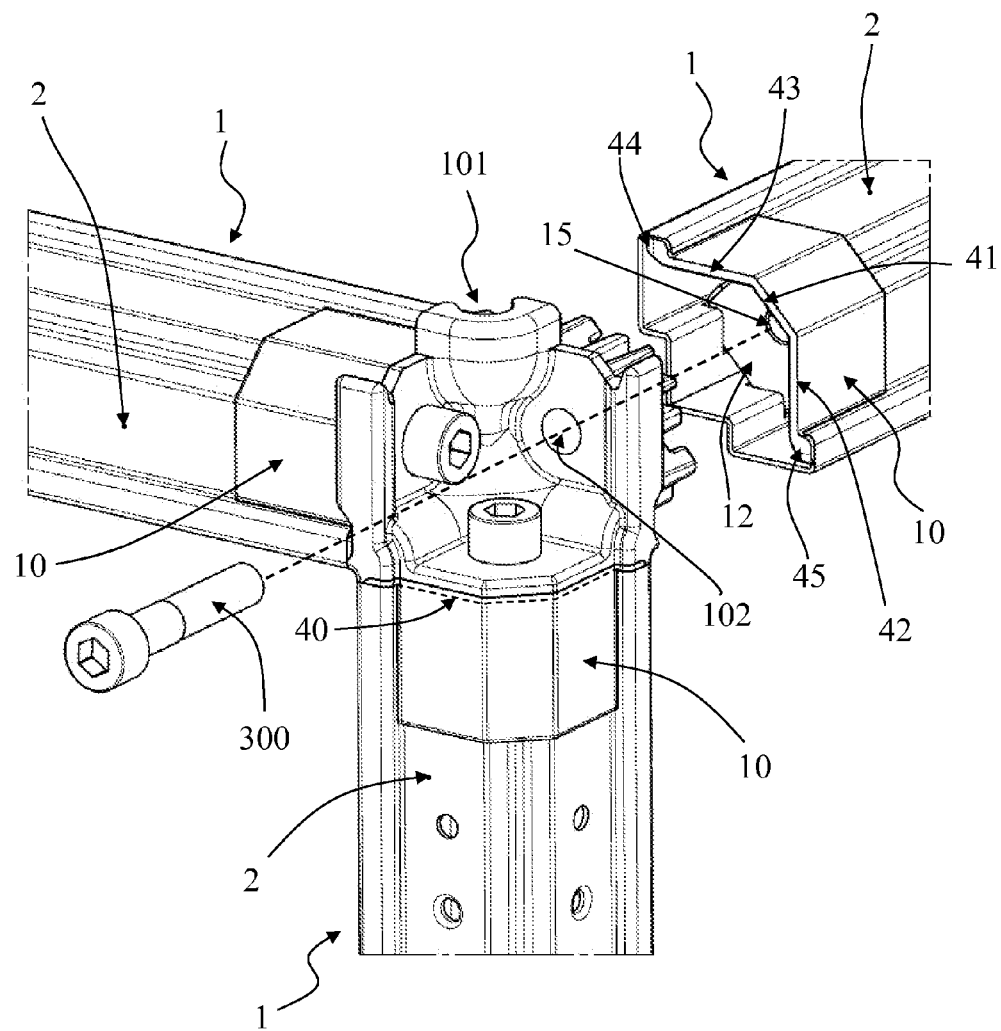
FIG. 10 is a perspective view of the corner joint element illustrated in FIG. 9, which is connected to two frame assemblies according to an exemplary embodiment of the present disclosure, and which is in phase of connection with a third frame assembly according to an exemplary embodiment of the present disclosure, by a fixing screw.
Figure 11:
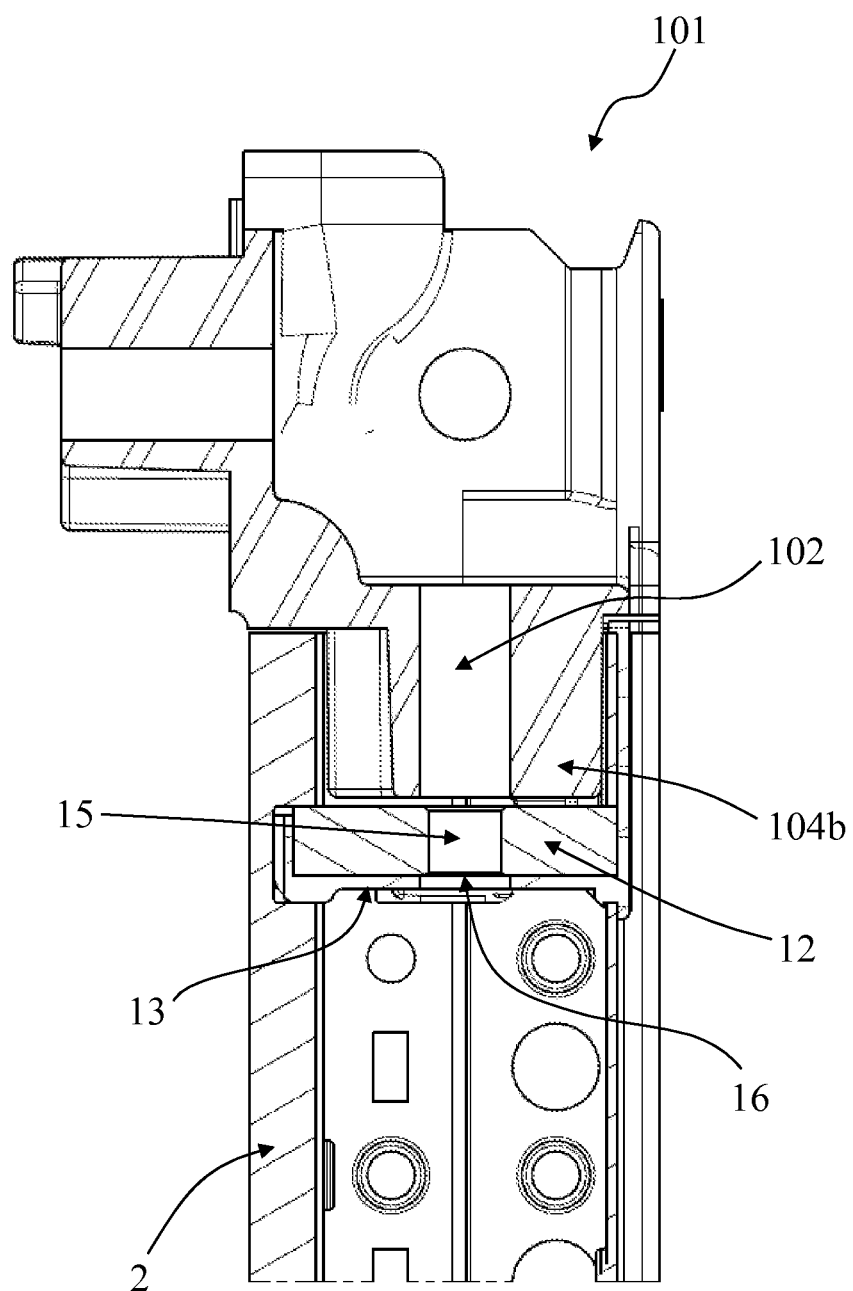
FIG. 11 is a section view of the corner joint element illustrated in FIG. 9 and of a corresponding frame assembly connected thereto.

With reference to FIGS. 10 and 11, the connector 300 used for connecting the frame assembly 1 to the corresponding corner joint element 101 can include, for example, one screw. Accordingly, the portion of the fixing metal plate 12 which is arranged into the hollow member 2 includes a through hole 15 for receiving the screw, for example a threaded through hole 15.

Figure 5:
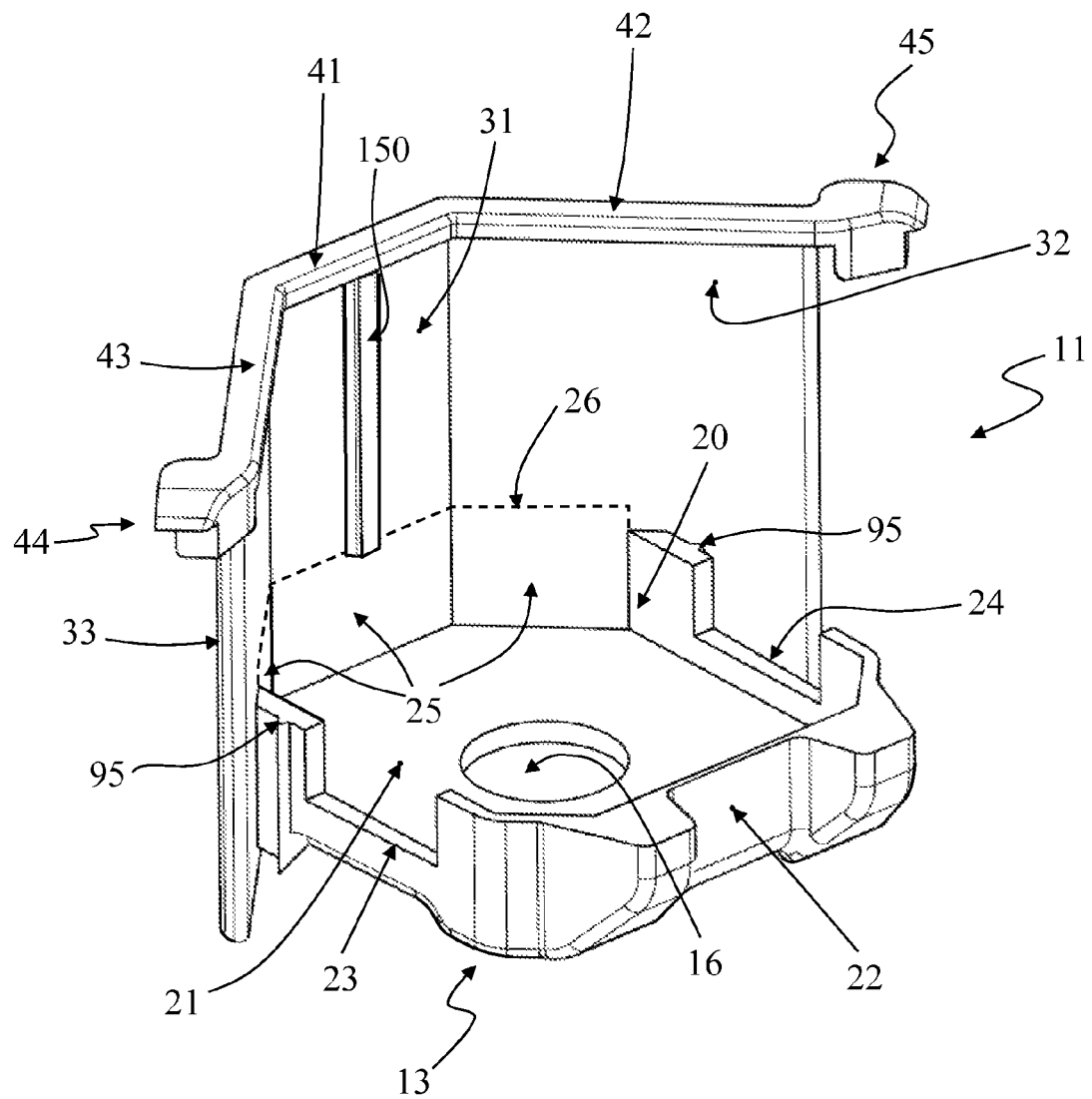
FIG. 5 is perspective view of the insulating body of the connecting element illustrated in FIG. 4.

According to the exemplary embodiment illustrated in FIG. 5, a through hole 16 can be advantageously defined also in the carrying part 13. For example, such through hole 16 can be defined aligned with respect to the through hole 15 of the carried fixing metal plate 12, for receiving therethrough the screw passing through the hole 15. In this way, the coupling between the screw and the connecting element 10 is improved, meaning a better overall connection between the frame assembly 1 and the corresponding corner joint element 101.

Figure 4:
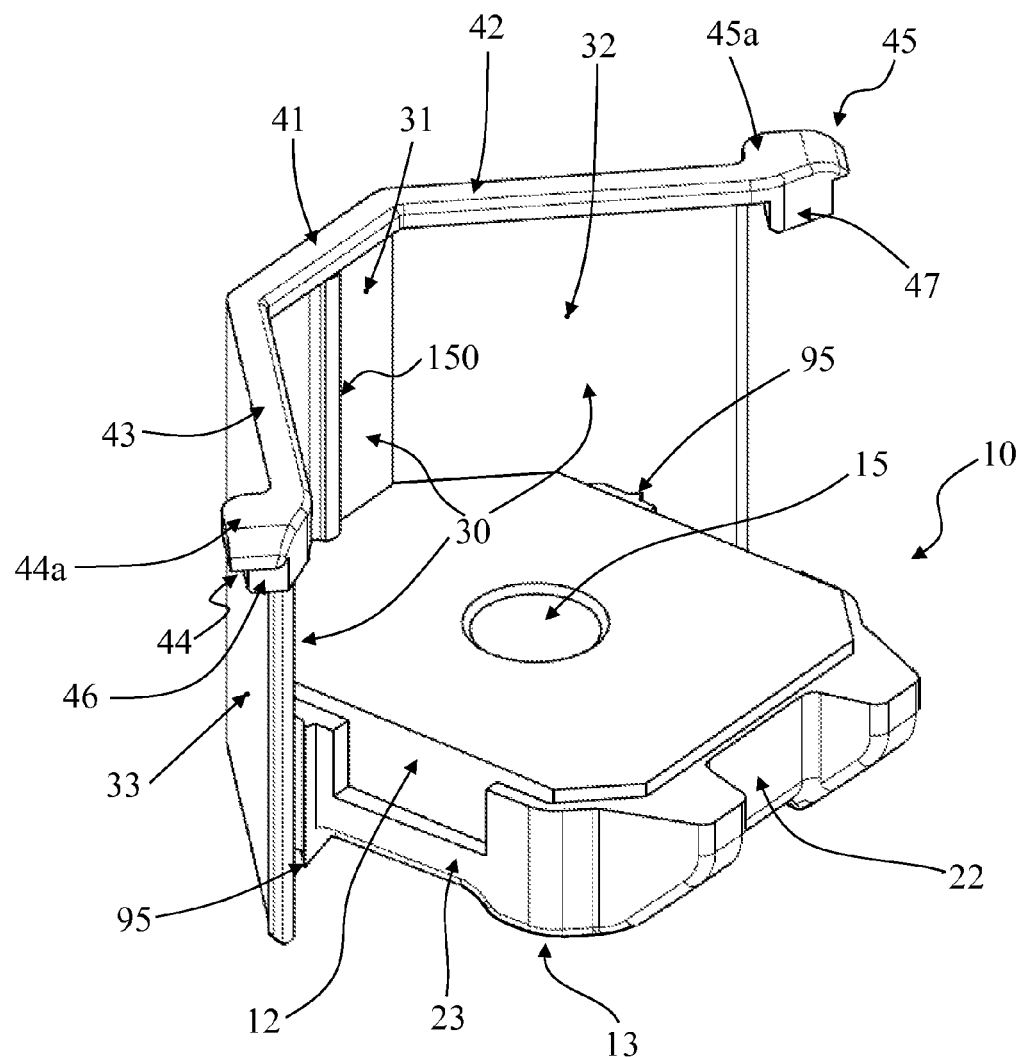
FIG. 4 is a perspective view of a connecting element adapted for being associated to the hollow member illustrated in FIGS. 1-2 for a frame assembly according to an exemplary embodiment of the present disclosure, wherein the illustrated connecting element includes an insulating body and an associated metal plate.

According to the exemplary connecting element 10 illustrated in FIGS. 4-5, the carrying part 13 is adapted to define a seat 20 into which the fixing metal plate 12 is mounted for assembling the connecting element 10.

Alternatively, the fixing metal plate 12 and the insulating body 11 of the connecting element 10 can be directly fabricated as a single piece. For example, the fixing metal plate 12 and associated carrying part 13 of the insulating body 11 can be manufactured as a single piece by an injection process.

The seat 20 can be adapted to allow only a predetermined correct mounting of fixing metal plate 12 therein (e.g., a mounting allowing the coupling inside the hollow member 2 between fixing metal plate 12 and the corresponding connector 300). For example, according to the embodiment illustrated in FIGS. 4 and 5, the shape of the fixing metal plate 12 and the shape of the corresponding seat 20 can be defined to match to each other, when the fixing metal plate 12 is correctly mounted into the seat 20 as illustrated in FIG. 4.

According to the exemplary connecting element 10, the insulating body 11 can include a covering part 30 adapted to cover a corresponding outer surface of the hollow member 2, when the carrying part 13 is at least partially inserted into the hollow member 2 through the corresponding slot 50, 51. For example, the covering part 30 can be arranged substantially transversal with respect to the fixing metal plate 12 associated to the carrying part 13.

The covering part 30 can be adapted to cover at least a corresponding outer surface of the hollow member 2 which surrounds the slot 50, 51 used for at least partially inserted the carrying part 13 and the associated fixing metal plate 12 into the hollow member 2.

According to the exemplary connecting element 10 illustrated in the attached figures, the covering part 30 can extend transversally with respect to the fixing metal plate 12 so as to reach a corresponding end 6 or 7 of the hollow member 2.

In this case the insulating body 11 can include a rim 40 connected to the covering part 30 and which can be adapted to cover at least a tract of a corresponding edge 80, 81 of the hollow member 2.

The rim 40 can include at least one portion 46, 47 adapted to couple the connecting element 10 and the hollow member 2 to each other. For example, such coupling portion 46, 47 is adapted to be inserted into the hollow member 2, so as to contact a corresponding internal surface of the hollow member 2.

For example, with reference to the hollow member 2 illustrated in FIGS. 1-2, if the carrying part 13 of the connecting element 10 is at least partially inserted into the hollow member 2 through the slot 50, the covering part 30 extends transversally with respect to the inserted fixing metal plate 12 until reaching the upper end 6 of the hollow member 2, and a tract of the upper edge 80 is covered by the rim 40. If the carrying part 13 is at least partially inserted into the hollow member 2 through the slot 51, the covering part 30 extends transversally with respect to the inserted fixing metal plate 12 until reaching the lower end 7 of the hollow member 2, and a tract of the lower edge 81 is covered by and coupled to the rim 40.

The connecting element 10 illustrated in FIGS. 4 and 5 is herein further disclosed for exemplary purpose.

The seat 20 of the illustrated connecting element 10 includes a base wall 21 onto which the fixing metal plate 12 is laid. The through hole 16 for the screw is defined through the base wall 21, so as to be aligned with the through hole 15 of the mounted fixing metal plate 12.

The seat 20 is further defined by portions of the insulating body 11 which protrude transversally from the base wall 21 and which are adapted to pass through the corresponding slot 50, 51 of the hollow member 2, for arranging of the fixed metal plate 12 into the hollow member 2 itself. For example, such portions include two lateral portions 23 and 24 which protrude from the base wall 21 faced to each, and a front portion 22 which transversally connects the two lateral portions 23 and 24 to each other.

The insulating body 11 can include one or more walls 31, 32, 33 which are transversally connected to the base wall 21 and which extend so as to provide the covering part 30 of the insulating body 11. For example, such covering part 30 is adapted to cover a corresponding outer surface of the hollow member 2 surrounding the slot 50, 51 used for inserting the carrying part 13 and the associated fixing metal plate 12 into the hollow member 2.

In the exemplary embodiment illustrated in FIGS. 4 and 5, the insulating body 11 includes three walls 31, 32, 33 which are transversally connected to the base wall 21. A part of such walls 31, 32, 32 can provide a surface 25 which extends between the two lateral portions 23 and 24 of the seat 20 for covering a corresponding tract of the edge of the mounted fixing metal plate 12. For clarity sake, a dotted line 26 is drawn in FIG. 5 for upwardly delimiting this surface 25.

The remaining part of the walls 31, 32, 33 is adapted to define the overall covering part 30 of the connecting element 10. With reference to FIGS. 6-8, such covering part 30 can be particularly adapted to be associated with the exemplary hollow member 2 illustrated in FIGS. 1-2. Indeed, the walls 31, 32, 33 extend transversally with respect to the base wall 21 so as to cover a corresponding outer surface of the central wall 68, of the wall 60 and of the wall 61, respectively, of the hollow member 2.

For example, the walls 31, 32, 33 extends transversally with respect to the base wall 21 so as to reach the upper end 6 of the hollow member 2 (if the carrying part 13 is at least partially inserted into the hollow member 2 through the slot 50, as illustrated for example in FIGS. 6-8), or so as to reach the lower end 7 (if the carrying part 13 is at least partially inserted into the hollow member 2 through the slot 51).

With particular reference to FIG. 3 and FIG. 8, the rim 40 of the exemplary illustrated connecting element 10 includes at least: a first tract 41 which is connected to the upper end of the wall 31 for covering a corresponding tract of the edge 80 belonging to the central wall 68 of the hollow member 2; a second tract 42 which is connected to the upper end of the wall 32 for covering a corresponding tract of the edge 80 belonging to the wall 60; and a third tract 43 which is connected to the upper end of the wall 33 for covering a corresponding tract of the edge 80 belonging to the wall 62.

An exemplary rim 40 can include a first end 44 and a second end 45 which are connected to the tract 43 and to the tract 42, respectively.

The first end 44 includes: a tract 44a which is adapted to cover a corresponding tract of the edge 80 belonging to the walls 70 and 72 of the hollow member 2; and a coupling portion 46 which is configured as a tooth 46 adapted to be inserted in the hollow space between the walls 65, 70, 72 of the hollow member 2, for coupling the connecting element 10 to the hollow member 2 itself.

The second end 45 includes: a tract 45a which is adapted to cover a corresponding tract 80 belonging to the walls 69 and 71 of the hollow member 2; and a coupling portion 47 which is configured as a tooth 47 adapted to be inserted in the hollow space between the walls 67, 69, 71 of the hollow member 2, for coupling the connecting element 10 to the hollow member 2 itself.

In the same way, the illustrated rim 40 can be adapted to couple with and cover a corresponding tract of the edge 81 of hollow member 2 illustrated in FIGS. 1-3, if the carrying part 13 of the connecting element 10 is inserted into hollow member 2 through the slot 51.

The assembly 1 can include couplers for coupling the connecting element 10 and the associated hollow member 2 to each other, at the end of the insertion the carrying part 13 through the corresponding slot 50, 51 for arranging the fixing metal plate 12 into the hollow member 2.

According to the present disclosure, such couplers can include the one or more coupling portions 46, 47 of the rim 40.

Alternatively or in addition to the coupling portions 46, 47, the connecting element 10 can include resilient members defined in the carrying part 13. The resilient members 95 can be adapted to couple the connecting element 10 to the hollow member 2 in a snap-fit way, when the carrying part 13 is at least partially inserted into the hollow member 2 through the corresponding slot 50, 51.

The resilient members can include at least one tooth 95 which is adapted to be elastically deformed by a corresponding one of the tracts 52-55 of the hollow member 2 delimiting the slot 50, 51, during a portion of the insertion of the carrying part 13 into the hollow member 2 and return in a rest position, so as to couple the connecting element 10 to the hollow body 2.

In the exemplary embodiment illustrated in FIGS. 4-5, each of the two faced lateral portions 23 and 24 of the insulating body 11 includes the tooth 95. For example, the tooth 95 of the lateral portion 23 and the tooth 95 of the lateral portion 24 are adapted to operatively interact with the delimiting tract 54 and the delimiting tract 55, respectively, of the used slot 50, 51.

Alternatively or in addition to the coupling portions 46, 47 of the rim 40 and/or the resilient member 95, at least one hole 90, 91, 92, 93 can be defined through the hollow member 2 in such a way to face the slot 50, 51 used for at least partially inserting the carrying part 13 into the hollow member 2. The hole 90, 91, 92, 93 can be adapted for receiving therethrough at least a corresponding tract 96, 97 of the carrying part 13 which is inserted into the hollow member 2. With reference to FIG. 8, the hole 90, 91, 92, 93 can be adapted for receiving therethrough the tract 96, 97 of the carrying part 13 and a corresponding carried tract 12a, 12b of the fixing metal plate 12.

The exemplary hollow member 2 illustrated in FIGS. 1-3 includes a first couple of holes 90, 91 which are defined so as to face the slot 50. For example, the hole 90 can be defined along a tract the walls 62 and 66 of the hollow member 2, and the hole 91 can be defined along a tract of the walls 63 and 64. The illustrated hollow member 2 further includes a second couple of holes 92, 93 which are defined so as to face the slot 51. For example, the hole 92 can be defined along a tract the walls 62 and 66 of the hollow member 2, and the hole 93 can be defined along a tract of the walls 63 and 64.

Accordingly, with particular reference to FIG. 8, the carrying part 13 includes two tracts 96 and 97 which carry corresponding tracts 12a and 12b of the fixing metal plate 12. The holes 90 and 91 are adapted to receive therethrough the two tracts 96 and 97 and the corresponding carried tracts 12a and 12b of the fixing metal plate 12, when the carrying part 13 is inserted into the hollow member 2 through the slot 50.

In the same way, the holes 92 and 93 are adapted to receive therethrough the two tracts 96 and 97 and the corresponding carried tracts 12a and 12b of the fixing metal plate 12, if the carrying part 13 is inserted into the hollow member 2 through the slot 51.

Furthermore, the hollow member 2 can include a groove 151, and the covering part 30 of the connecting element 10 can include a corresponding protrusion 150, 152 adapted to couple with the groove 151, when the carrying part 13 is at least partially inserted into the hollow member 2 through the corresponding slot 50, 51.

In the exemplary embodiment illustrated in FIG. 4, the protrusion 150 is defined in the covering part 30 so as to extend between the first tract 41 of the rim 40 and the fixing metal plate 12 mounted into the seat 20. With reference to FIG. 7, a further protrusion 152 is defined in the covering part 30, so as to extend from base wall 21 of the seat 20 below the protrusion 150.

The illustrated protrusions 150 and 152 are adapted to couple with corresponding tracts of the groove 151 defined in the wall 68 of the hollow member 2 along the reference axis 500, when the carrying part 13 is at least partially inserted into the hollow member 2 through the corresponding slot 50, 51.

Figure 12:
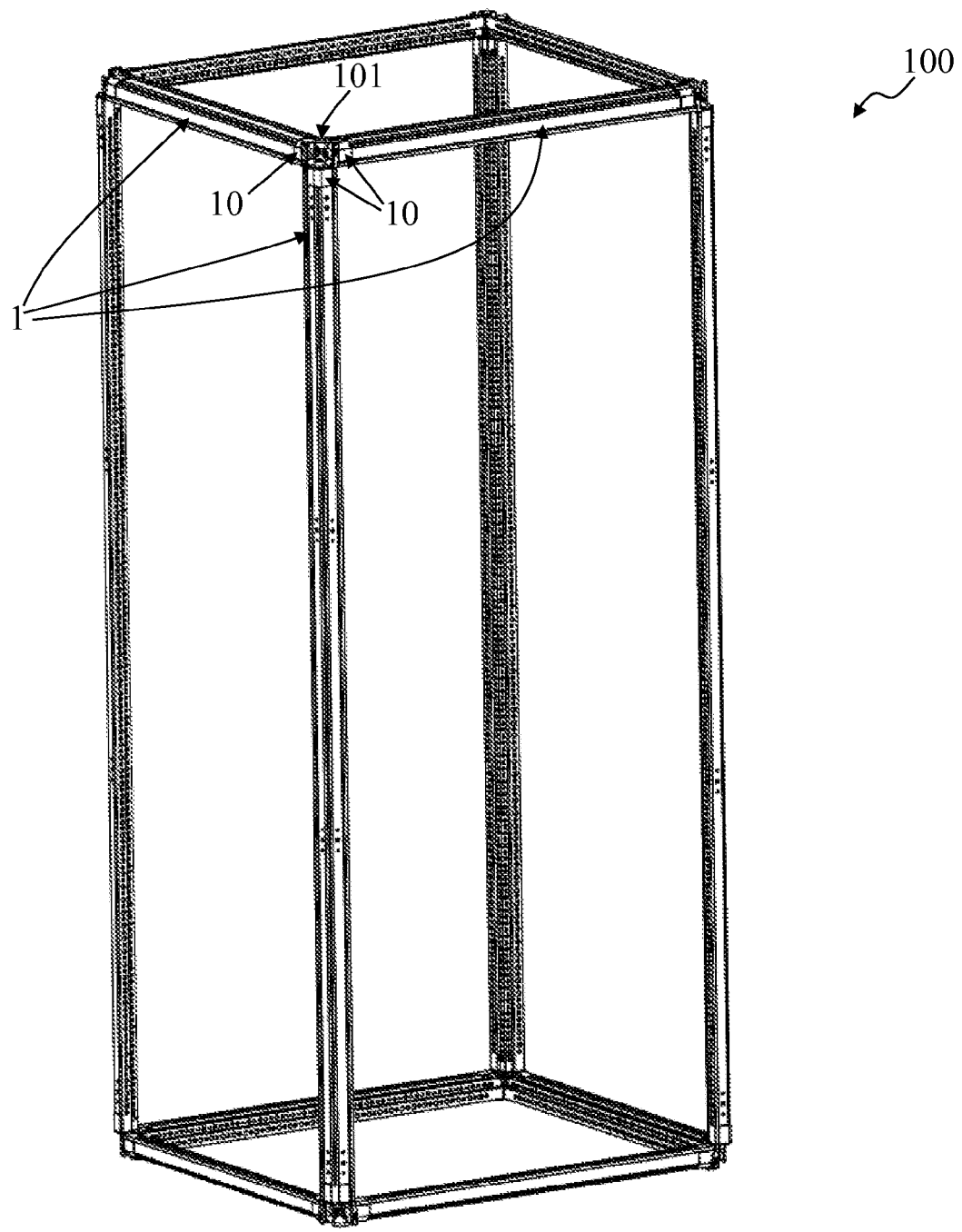
FIG. 12 is a perspective view of a frame including a plurality of frame assemblies according to an exemplary embodiment of the present disclosure.
Figure 13:
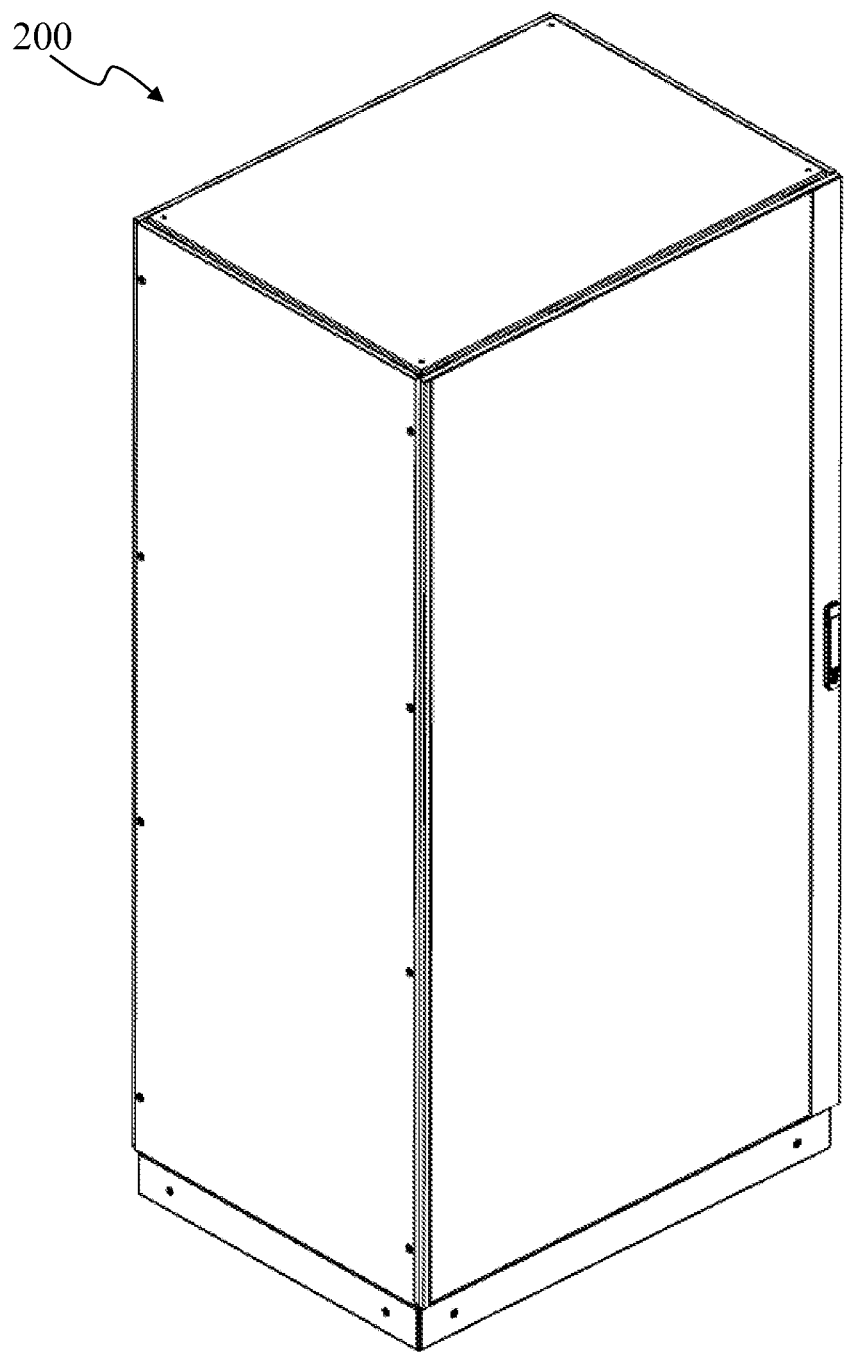
FIG. 13 is a perspective view of a switchboard including a frame according to an exemplary embodiment of the present disclosure.

With reference to FIGS. 12 and 13, exemplary embodiments of the present disclosure also relate to the frame 100 for an electrical switchboard 200, and to the related switchboard 200.

The frame 100 includes at least one corner joint element 101 which is adapted to mutually connect a plurality of frame assemblies 1 to each other. Each of such frame assemblies 1 being connected to the corner joint element 101 by its connecting element 10, for example by coupling the fixing metal plate 12 transversally arranged into the hollow member 2 with the corresponding connector 300.

Figure 9:
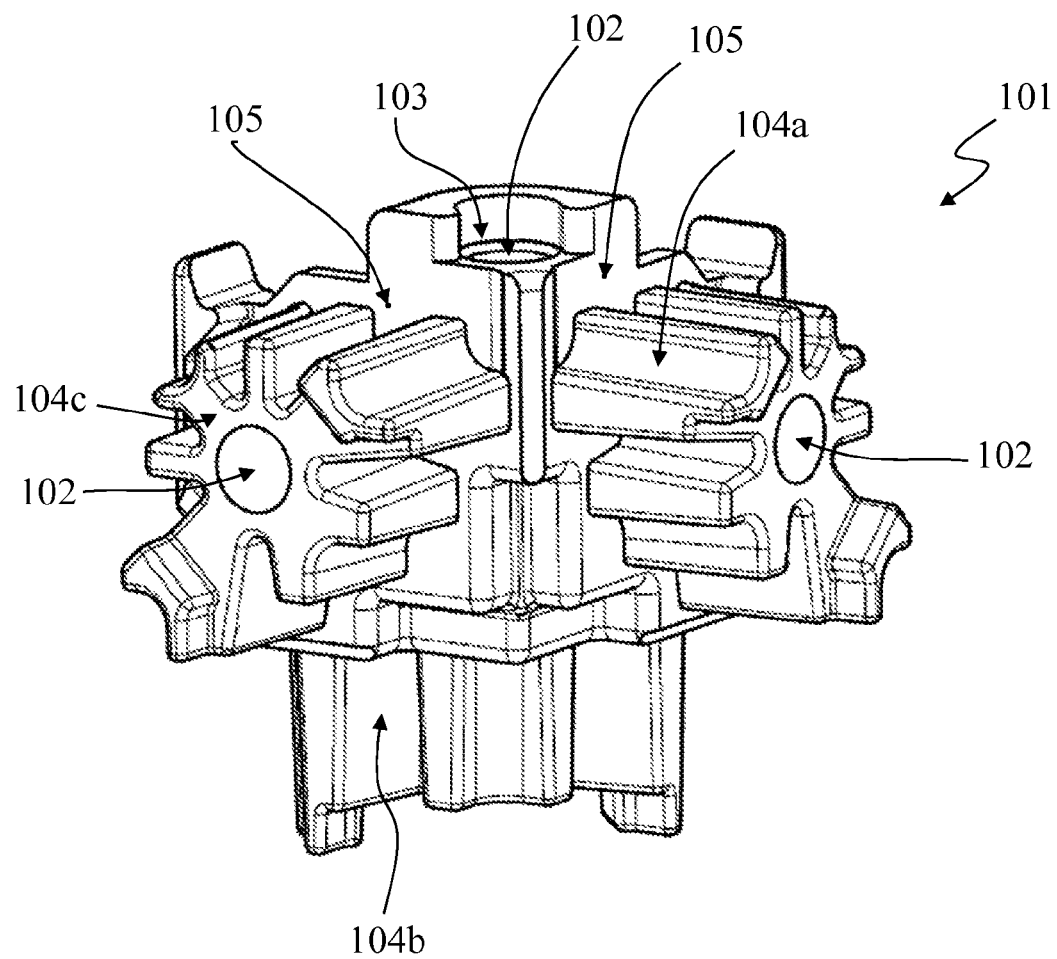
FIG. 9 is a perspective view of a corner joint element for the frame of a switchboard according to an exemplary embodiment of the present disclosure.

According to the exemplary embodiment illustrated in FIGS. 9-11, the corner joint element 101 includes at least one through hole 102 which is adapted to receive therethrough the screw for fixing one frame assembly 1 to the corner joint element 101. For example, the through hole 102 is adapted to be crossed by the screw according to a direction suitable for inserting such screw lengthwise into the hollow member 2 of the frame assembly 1. In this way, the screw can intercept and couple with the fixing metal plate 12 arranged transversal with respect to the insertion direction of the screw.

The corner joint element 101 can include a main body 103 and one or more portions 104*a*, 104*b*, 104*c* which protrude from the main body 103 and which are adapted to be coupled with a corresponding frame assembly 1. For example, the protruding portion 104*a*, 104*b*, 104*c* is adapted to be inserted into the hollow member 2 of the corresponding frame assembly 1, so as to be arranged in the internal space of the hollow member 2 that is between the opening 3 or 4 and the fixing metal plate 12. In this way, the protruding portion 104*a*, 104*b*, 104*c* allows a guided positioning and mounting of the frame assembly 1 onto the main body 103.

In the exemplary embodiment illustrated in FIG. 12, the frame 100 has a substantially parallelepiped structure defined by mutually connecting a plurality of frame assembly 1 by four corner joint elements 101 arranged at the corners of the parallelepiped structure.

For example, the corner joint element 101 illustrated in FIG. 9 is adapted to mutually connect three frame assemblies 1 perpendicularly to each other. For example, the corner joint element 101 includes the three protruding portions 104*a*, 104*b*, 104*c* arranged transversally to each other; three through holes 102 are defined along the protruding portions 104*a*, 104*b* and 104*c* so as extend along three mutually perpendicular directions.

Each of the portions 104*a*, 104*b*, 104*c* protrude form a corresponding plane 105 of the main body 103, wherein such plane 105 is adapted to contact at least a tract of the rim 40 of the connecting element 10, when the frame assembly 1 is mounted on the corner joint element 101 by the protruding portion 104*a*, 104*b*, 104*c*. For example, in the embodiment illustrated in FIGS. 9-11 the plane 105 is adapted to contact the tracts 41, 42, 43, 44*a* and 45*a* of the rim 40.

In this way, after that the frame assembly 1 has been fixed to the corner joint element 101 by the screw, the rim 40 can be compressed between the corresponding covered tract of the edge 80 or 81 of the hollow member 2 and the plane 105 of the corner joint element 101.

Further, the protruding portion 104*a*, 104*b*, 104*c* can be adapted to contact a corresponding inner surface of the hollow member 2; in this way, a relative rotation between the frame assembly 1 and the corner joint element 101 is avoided, or at least limited.

The operative assembling of the frame assembly 1 and its connection to the corresponding joint element 101 of the frame 100 are herein described by making particular reference to the exemplary frame assembly 1 illustrated in FIGS. 7-8 and 10, and to the exemplary corner joint element 101 illustrated in FIGS. 9-11.

First, the fixing metal plate 12 is mounted on the respective seat 20 defined in the carrying part 13 of the insulating body 11, so as to assemble the connecting element 10.

Then, the carrying part 13 is inserted into the hollow member 2 transversally with respect to the reference axis 500 through a corresponding one of the slots 50 and 51, so as to arrange at least a portion of the fixing metal plate 12 into the hollow member 2 transversal with respect to the reference axis 500 itself.

During this insertion, the connecting element 10 is snap-fit coupled to the hollow member 2 by the two teeth 95.

Further, the tracts 96 and 97 (and the corresponding carried tracts 12*a* and 12*b* of the fixing metal plate 12) are inserted into the respective holes 90, 91 or 92, 93 of hollow member 2.

At the end of the insertion of the carrying part 13 and associated fixing metal plate 12 into the hollow member 2, the covering part 30 of the connecting element 10 covers the corresponding outer surface of the hollow member 2. For example the walls 31, 32 and 33 extend transversally from the base wall 21 so as to cover a corresponding outer surface of the walls 68, 60 and 61 of the hollow member 2, respectively.

The protrusions 150 and 152 of the covering part 30 are inserted into corresponding tracts of the groove 151 of the hollow member 2.

The rim 40 covers a corresponding tract of the edge 80 or 81 of the hollow member 2. For example, the tracts 41, 42 and 43 of the rim 40 cover a corresponding tract of the edge 80 or 81 belonging to the walls 68, 60 and 61, respectively, of the hollow member 2. The tract 44*a* covers a corresponding tract of the edge 80 or 81 belonging to the walls 70 and 72. The tract 45*a* covers a corresponding tract of the edge 80 or 81 belonging to the walls 69 and 71.

The coupling portions 46, 47 of the rim 40 are inserted into the hollow member 2 so as to contact corresponding internal surfaces of such hollow member 2 and couple the connecting element 10 and the hollow member 2 to each other.

The frame assembly 1 so realized is then mounted onto the central body 103 of the corner joint element 101 a corresponding protruding portion 104*a*, 104*b*, 104*c*, so as the plane 105 of the central body 103 contacts the rim 40 of the connecting element 10.

The screw 300 passes through the hole 102 defined along the used protruding portion 104*a*, 104*b*, 104*c* so as to reach and couple with the fixing metal plate 12 arranged into the hollow member 2. In this way, the rim 40 is compressed between the plane 105 of the corner joint element 101 and the corresponding covered tract of the edge 80 or 81 of the hollow member 2.

In practice, it has been seen how the frame assembly 1 according to exemplary embodiments of the present disclosure, and related frame 100 and switchboard 200, allow achieving the intended object offering some improvements over known solutions.

For example, the frame assembly 1 is not realized only by the hollow member 2, but it also includes the connecting element 10 for providing connection to the corresponding corner joint element 101 of the frame 100.

The carrying part 13 of the connecting element 10 not only carries the fixing metal plate 12 but it also correctly arranges the fixing metal plate 12 into the hollow member 2, according to an effective solution which only involves the at least partial insertion of the carrying part 13 and associated fixing metal plate 12 into the hollow member 2, through the corresponding slot 50, 51.

This inserting operation, occurring transversally with respect to the lengthwise extension of the hollow member 2, can be easily performed, even by automatic assembling, such as by industrial robots.

According to the exemplary embodiment illustrated in FIGS. 4-8, the connecting element 10 can be coupled to the hollow member 2 without using fixing screws. For example, this coupling can be achieved by the snap-fit coupling resilience member 95 provided on the carrying part 13 of the connecting element 10, and/or by the coupling portions 46, 47 of the rim 40, and/or by the portions 96, 97 of the carrying part 13, and/or by coupling the protrusions 150, 152 of the covering part 30 to the corresponding groove 150 of the hollow member 2.

Even without using fixing screws, the coupling between the connecting element 10 and the hollow member 2 can be stable and effective, allowing the delivery of the already assembled frame assemblies 1 to the customer.

For example, the transversal insertion of the carrying part 13 and associated fixing metal plate 12 into the hollow member 2 keeps such coupling effective even in case of dimensional variations of the hollow members 2 introduced by the manufacturing process.

The presence of the fixing metal plate 12 already correctly inserted into the hollow member 2 of the frame assembly 1 allows at least a simplification of the structure of the corresponding corner joint element 101, an economic connection between the frame assembly 1 and the corner joint element 101, which can involve a reduced number of fixing screws (for example only one screw connector 300) while guaranteeing the desired mechanical performances for such connection.

Also the operations of the customer to assemble the frame 100 are reduced and simplified. The customer can receive the frame assembly 1 already stably assembled, and therefore he has only to fix it to the corner joint element 101, through a single screwing operation.

A further exemplary is related to the packaging for delivering the elements for assembling the frame 100 to the customers. For example, the use of structurally simple corner joint elements, of frame assemblies 1 already assembled, and the reduction of the fixing screws imply optimized packaging solutions, particularly in term of dimensions and costs.

Furthermore, according to the exemplary embodiment illustrated in FIGS. 4-8, the insulating body 11 of the connecting element 10 can be advantageously used also for improving the protection rating (usually indicated as IP Code or IP Rating) of the cabinet 200 against the intrusion of solid objects, dust, water, et cetera into the internal volume provided by the frame 100.

For example, the protection rating is improved by the covering part 30 of the insulating body 11, for example by defining this covering part 30 for surrounding the slot 50, 51 and/or for extending until reaching the corresponding end 6, 7 of the hollow member 2.

The protection rating can be further particularly improved by providing the insulating body 11 with the rim 40 for covering a corresponding tract of the edge 80, 81 of the hollow member 2. For example, in the exemplary illustrated embodiment of FIGS. 7-8, such covered tract belongs to the rear portion of the hollow member 2 (which is intended to face outwards with respect to the internal volume of the frame 100).

At the end of the connection between the frame assembly 1 and the corresponding corner joint element 101, the rim 40 is compressed between the plane 105 of the corner joint element 101 and the covered tract of the edge 80, 81 of the hollow member 2, so as to guarantee a high protection rating of the switchboard 200.

The protection rating can be improved by realizing the insulating body 11 with rubber.

The frame assembly 1 thus dissolved, and related frame 100 and switchboard 200, are also susceptible of modifications and variations, all of which are within the scope of the inventive concept as defined for example by the appended claims.

For example, the frame 100 illustrated in FIG. 12 has only an exemplary purpose and the frame assemblies 1 can be used to realize a frame 100 having a different shape and/or dimensions.

Furthermore, the corner joint element 101 can be adapted to mutually connect a single frame assembly 1 according to exemplary embodiments of the present disclosure to other two frame members of different typology, such as known frame members, or it can be adapted to mutually connect two frame assemblies 1 according to the present disclosure 1 to one frame member of different typology. Furthermore, even if in the exemplary embodiment of FIGS. 4-5 the illustrated connecting element 10 is particularly adapted for being associated to the exemplary hollow member 2 illustrated in FIGS. 1-2, the connecting element 10 of the frame assembly 1 according to exemplary embodiments of the present disclosure can be adapted for being associated to hollow members 2 having a shape different with respect to the hollow member 2 illustrated in FIGS. 1-2.

Even if the corner joint element 101 illustrated for example in FIG. 9 is adapted to be connected to the particular exemplary frame assembly 1 illustrated in FIG. 10, it is to be set forth that the corner joint element 101 according to exemplary embodiments of the present disclosure can be adapted to be connected to a frame assembly 1 having a hollow member 2 with a shape different with respect to the hollow member 2 illustrated in FIGS. 1-2.

The connecting element 10 of the frame assembly 1 according to exemplary embodiments of the present disclosure can be made of different assembled parts or members, such as the exemplary connecting element illustrated in FIG. 4 which is assembled by mounting the fixing metal plate 12 into the corresponding seat 20 defined in the carrying part 13 of the insulating body 11.

Alternatively, the connecting element 10 can be made as a single piece.

Moreover, all parts/components can be replaced with other technically equivalent elements. In practice, the type of materials, and the dimensions, can be any according to needs and to the state of the art.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An assembly for a frame of a switchboard, comprising:
a hollow member comprising a first end and a second end, the hollow member extends lengthwise between the first and second ends along a reference axis, the hollow member including a hollow interior and at least one slot formed between the first end and the second end to provide access to the hollow interior;

at least one connecting element configured for connecting the hollow member to a corresponding corner joint element of the frame, each connecting element including an insulating body having a carrying part; and a fixing metal plate for the carrying part of the insulating body, the fixing metal plate having a first through hole that is aligned with a second through hole of the carrying part, the fixing metal plate sized for insertion with the carrying plate into the at least one slot wherein the carrying part is at least partially inserted transversally, with respect to the reference axis, into the hollow member through the at least one slot, so as to arrange at least a portion of the fixing metal plate into the hollow member transversally with respect to the reference axis and to substantially align the first and second through holes with the reference axis; wherein, when in use, the first and second through holes are configured to receive a corresponding fixing screw which is configured to be inserted within the hollow section of the hollow member from the first or second end to fasten the at least one connecting element to the corresponding corner joint element.

2. The assembly according to claim 1, wherein the carrying part defines a seat into which the fixing metal plate is mounted.

3. The assembly according to claim 2, wherein the seat is configured for a predetermined mounting of the fixing metal plate therein.

4. The assembly according to claim 1, wherein the insulating body comprises:
a covering part adapted to cover a corresponding outer surface of the hollow member when the carrying part is at least partially inserted into the hollow member through the at least one slot.

5. The assembly according to claim 4, wherein the covering part is adapted to cover
at least a corresponding outer surface of the hollow member which surrounds the at least one slot.

6. The assembly according to claim 4, wherein the covering part extends transversally with respect to the fixing metal plate so as to reach a corresponding end of the hollow member.

7. The assembly according to claim 6, when the insulating body comprises:
a rim connected to the covering part and adapted to cover a corresponding tract of an edge of the hollow member at the corresponding end.

8. The assembly according to claim 7, wherein the rim comprises:
at least one coupling portion configured to couple the at least one connecting element to the hollow member.

9. The assembly according to claim 1, comprising:
at least one hole defined through the hollow member facing the at least one slot, the at least one hole being adapted for receiving therethrough a corresponding tract of the carrying part, when the carrying part is at least partially inserted into the hollow member though the at least one slot.

10. The assembly according to claim 1, wherein the carrying part comprises:
a resilient member for coupling the connecting element to the hollow member in a snap-fit way when the carrying part is at least partially inserted into the hollow member through the at least one slot.

11. The assembly according to claim 1, wherein the insulating body is made of elastic material.

12. The assembly according to claim 4, wherein the covering part comprises:
at least one protrusion, and the hollow member includes a corresponding groove, the at least one protrusion and the corresponding groove being adapted to couple to each other.

13. A frame for a switchboard, comprising:
at least one frame assembly comprising
a hollow member comprising a first end and a second end, the hollow member extends lengthwise between the first and second ends along a reference axis, the hollow member including a hollow interior and at least one slot formed between the first end and the second end to provide access to the hollow interior;
at least one corner joint element;
at least one connecting element configured for connecting the hollow member to the at least one corner joint element of the frame, each connecting element including an insulating body having a carrying part; and a fixing metal plate for the carrying part of the insulating body, the fixing metal plate having a first through hole that is aligned with a second through hole of the carrying part, the fixing metal plate sized for insertion with the carrying plate into the at least one slot wherein the carrying part is at least partially inserted transversally, with respect to the reference axis, into the hollow member through the at least one slot, so as to arrange at least a portion of the fixing metal plate into the hollow member transversally with respect to the reference axis and to substantially align the first and second through holes with the reference axis; wherein, when in use, the first and second through holes are configured to receive a corresponding fixing screw which is configured to be inserted within the hollow section of the hollow member from the first or second end to fasten the at least one connecting element to the at least one corner joint element.

14. A switchboard comprising:
a frame according to claim 13.

* * * * *